United States Patent
Sander et al.

(10) Patent No.: US 8,752,064 B2
(45) Date of Patent: Jun. 10, 2014

(54) OPTIMIZING COMMUNICATION OF SYSTEM CALL REQUESTS

(75) Inventors: Benjamin Thomas Sander, Austin, TX (US); Michael Houston, Cupertino, CA (US); Newton Cheung, San Jose, CA (US); Keith Lowery, Bothell, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 224 days.

(21) Appl. No.: 13/307,505

(22) Filed: Nov. 30, 2011

(65) Prior Publication Data

US 2012/0180072 A1    Jul. 12, 2012

Related U.S. Application Data

(60) Provisional application No. 61/422,953, filed on Dec. 14, 2010.

(51) Int. Cl.
*G06F 13/00* (2006.01)

(52) U.S. Cl.
USPC ............................ 719/312; 712/244; 712/245

(58) Field of Classification Search
CPC ...... G06F 9/544; G06F 9/3861; G06F 9/4812
See application file for complete search history.

(56) References Cited

U.S. PATENT DOCUMENTS

| | | | | |
|---|---|---|---|---|
| 7,386,710 | B2 * | 6/2008 | Barry et al. | 712/245 |
| 8,312,254 | B2 * | 11/2012 | Coon et al. | 712/234 |
| 2006/0259529 | A1 | 11/2006 | Wood | |
| 2009/0144742 | A1 | 6/2009 | Subhraveti et al. | |
| 2009/0300621 | A1 | 12/2009 | Mantor et al. | |
| 2010/0299665 | A1 * | 11/2010 | Adams | 718/1 |
| 2012/0072908 | A1 * | 3/2012 | Schroth et al. | 718/1 |
| 2012/0151182 | A1 * | 6/2012 | Madajczak | 712/5 |
| 2013/0138926 | A1 * | 5/2013 | Coon et al. | 712/220 |

OTHER PUBLICATIONS

International Preliminary Report on Patentability for International Patent Application No. PCT/US2011/064859, International Bureau of WIPO, mailed June 27, 2013, 6 pages.
International Search Report and Written Opinion for International Application No. PCT/US2011/64859, United States Patent and Trademark Office, United States, mailed on Apr. 5, 2012 (8 pages).

* cited by examiner

*Primary Examiner* — Andy Ho
(74) *Attorney, Agent, or Firm* — Sterne, Kessler, Goldstein & Fox P.L.L.C.

(57) ABSTRACT

Provided herein is a method for optimizing communication for system calls. The method includes storing a system call for each work item in a wavefront and transmitting said stored system calls to a processor for execution. The method also includes receiving a result to each work item in the wavefront responsive to said transmitting.

20 Claims, 4 Drawing Sheets

OPTIMIZING COMMUNICATION OF SYSTEM CALL REQUESTS

CROSS REFERENCE TO RELATED APPLICATIONS

This application claims the benefit of U.S. Provisional Application No. 61/422,953, filed on Dec. 14, 2010, which is incorporated herein by reference in its entirety.

BACKGROUND

1. Field of the Invention

The present invention is generally directed to computing systems. More particularly, the present invention is directed to an architecture for unifying the computational components within a computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available only for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of the CPU and GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In another example, some commands cannot execute on a GPU efficiently. For example, a GPU cannot effectively execute commands which involve an operating system ("OS") such as, for example, instructions that allocate memory or printing data to a computer screen can only be processed using a CPU. Because the GPU cannot perform these tasks, the GPU makes a request to the CPU to perform those tasks. These requests are known as system calls (syscalls).

Syscalls are expensive for the CPU to process. Often, syscalls are high-priority commands that require CPU's immediate attention. Each time the CPU receives a syscall request, the CPU stops processing its current processes, invokes the OS, processes the syscall, and then returns to processing its work.

When a GPU processes a wavefront, each work item can require a syscall for memory allocation or other instructions that the GPU cannot process (or cannot process readily). In a conventional system, a GPU makes a separate syscall request to the CPU for each work item. Because the work items execute in parallel, each work item makes the same syscall request to the CPU.

Each time a syscall request arrives to the CPU, the CPU stops processing its work, invokes the OS, processes the GPU's request, and returns to processing its own work. When multiple work items make separate syscall requests at the same time, the CPU wastes processing time as repeatedly pauses its own work, invokes the OS and attempts to processes syscall requests from the GPU.

SUMMARY OF EMBODIMENTS

What is needed, therefore, are systems and methods for optimizing (i.e., improving) communication between a CPU and a GPU involving syscalls.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

Embodiments of the present invention include a system, method and article of manufacture for optimizing communication for system calls. The method includes storing a system call for each work item in a wavefront and transmitting said stored system calls to a processor for execution. The method also includes responsive to said transmitting, receiving a result to each work item in the wavefront.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
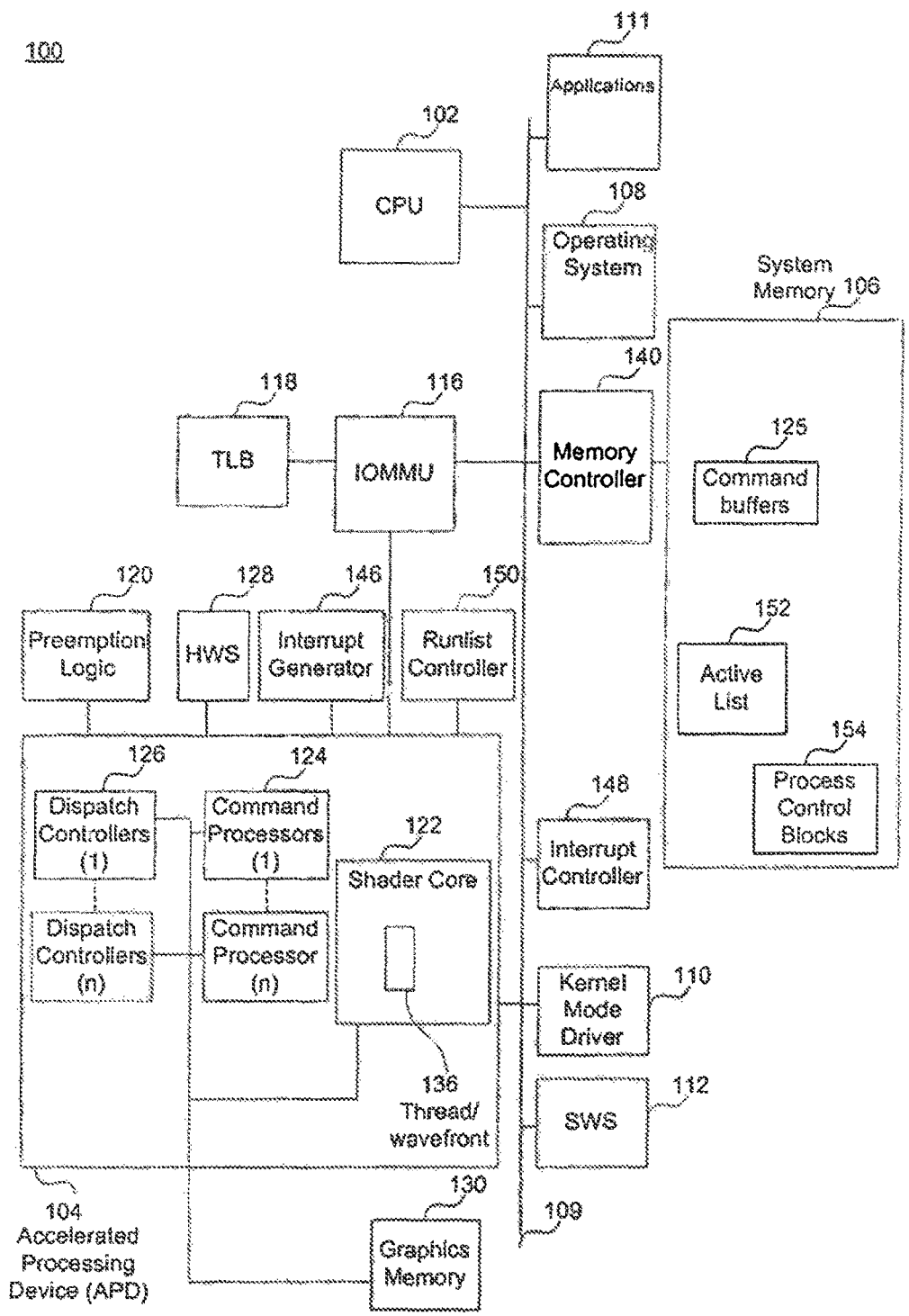
FIG. 1A is an illustrative block diagram of a processing system in accordance with embodiments of the present invention.

FIG. 1A is an exemplary illustration of a unified computing system 100 including a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface. Device drivers, particularly on modern Windows platforms, can run in kernel-mode (Ring 0) or in user-mode (Ring 3).

A benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user modules only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations, based on commands or instructions received from CPU 102.

For example, commands can be considered a special instruction that is not defined in the ISA and usually accomplished by a set of instructions from a given ISA or a unique piece of hardware. A command may be executed by a special processor such as a dispatch processor, command processor, or network controller. On the other hand, instructions can be considered, e.g., a single operation of a processor within a computer architecture. In one example, when using two sets of ISAs, some instructions are used to execute x86 programs and some instructions are used to execute kernels on APD/GPU compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more single instruction multiple data (SIMD) processing cores. As referred to herein, a SIMD is a math pipeline, or programming model, where a kernel is executed concurrently on multiple processing elements each with its own data and a shared program counter. All processing elements execute a strictly identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD/GPU compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a single SIMD engine can be referred to as a wavefront 136. The width of a wavefront is a characteristic of the hardware SIMD engine. As referred to herein, a workgroup is a collection of related work-items that execute on a single compute unit. The work-items in the group execute the same kernel and share local memory and work-group barriers.

All wavefronts from a workgroup are processed on the same SIMD engine. Instructions across a wavefront are issued one at a time, and when all work-items follow the same control flow, each work-item executes the same program. An execution mask and work-item predication are used to enable divergent control flow within a wavefront, where each individual work-item can actually take a unique code path through the kernel. Partially populated wavefronts can be processed when a full set of work-items is not available at wavefront start time. Wavefronts can also be referred to as warps, vectors, or threads.

Commands can be issued one at a time for the wavefront. When all work-items follow the same control flow, each work-item can execute the same program. In one example, an execution mask and work-item predication are used to enable divergent control flow where each individual work-item can actually take a unique code path through a kernel driver. Partial wavefronts can be processed when a full set of work-items is not available at start time. For example, shader core 122 can simultaneously execute a predetermined number of wavefronts 136, each wavefront 136 comprising a predetermined number of work-items.

Within the system 100, APD 104 includes its own memory, such as graphics memory 130. Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or (n) number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or (n) number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and a final state. An initial state is a starting point for a machine to process an input data set according to a program in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102. The term "processing logic" or "logic," as used herein, refers to control flow commands, commands for performing computations, and commands for associated access to resources.

During execution, respective applications, operating system functions, processing logic commands, and system software can reside in memory 106. Control logic commands fundamental to operating system 108 will generally reside in memory 106 during execution. Other software commands, including, for example, KMD 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context (sometimes referred to as process) can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects. On the other hand, process can be considered the execution of a program for an application will create a process that runs on a computer. The operating system can create data records and virtual memory address spaces for the program to execute. The memory and current state of the execution of the program can be called a process. The operating system will schedule tasks for the process to operate on the memory from an initial to final state.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. The unification concepts can allow CPU 102 to seamlessly send selected commands for processing on the APD 104. Under this unified APD/CPU framework, input/output requests from applications 111 will be processed through corresponding operating system functionality.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
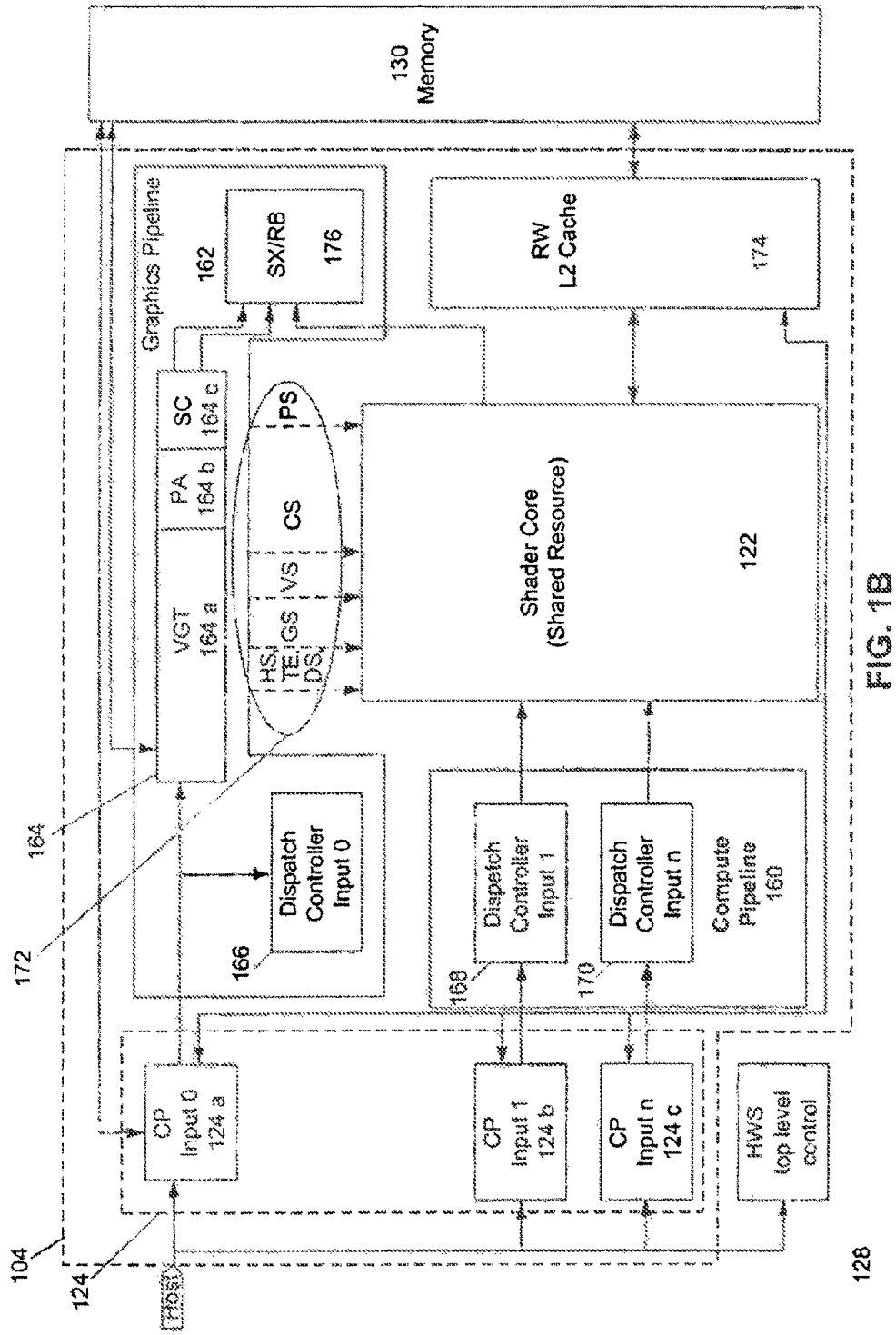
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Although other implementations that would be within the spirit and scope of the present invention can be used.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. The exception is for graphics work in shader core 122, which can be context switched.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data. Compute pipeline 160, however, does not send work to graphics pipeline 162 for processing. After processing of work within graphics pipeline 162 has been completed, the completed work is processed through a render back unit 176, which does depth and color calculations, and then writes its final results to graphics memory 130.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Additionally, and as will be apparent to one of skill in the art, the simulation, synthesis and/or manufacture of the various embodiments of this invention may be accomplished, in part, through the use of computer-readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer-readable code can be disposed in any known computer usable medium including semiconductor, magnetic disk, optical disk (such as CD-ROM, DVD-ROM) and as a computer data signal embodied in a computer-usable (e.g., readable) transmission medium (such as a carrier wave or any other medium including digital, optical, or analog-based medium).

As such, the code can be transmitted over communication networks including the Internet and intranets. It is understood that the functions accomplished and/or structure provided by the systems and techniques described above can be represented in a core (such as an APD core and/or a CPU core) that is embodied in program code and may be transformed to hardware as part of the production of integrated circuits.

Embodiments of the present invention allow programmers to write applications that seamlessly transition processing of data between CPUs and APDs, benefiting from the best attributes each has to offer. A unified single programming platform can provide a strong foundation for development in languages, frameworks, and applications that exploit parallelism.

The embodiments of the present invention allow programmers to write applications that seamlessly transition processing of data between CPUs and APDs, benefiting from the best attributes each has to offer. A unified single programming platform can provide a strong foundation for development in languages, frameworks, and applications that exploit parallelism.

Figure 2:
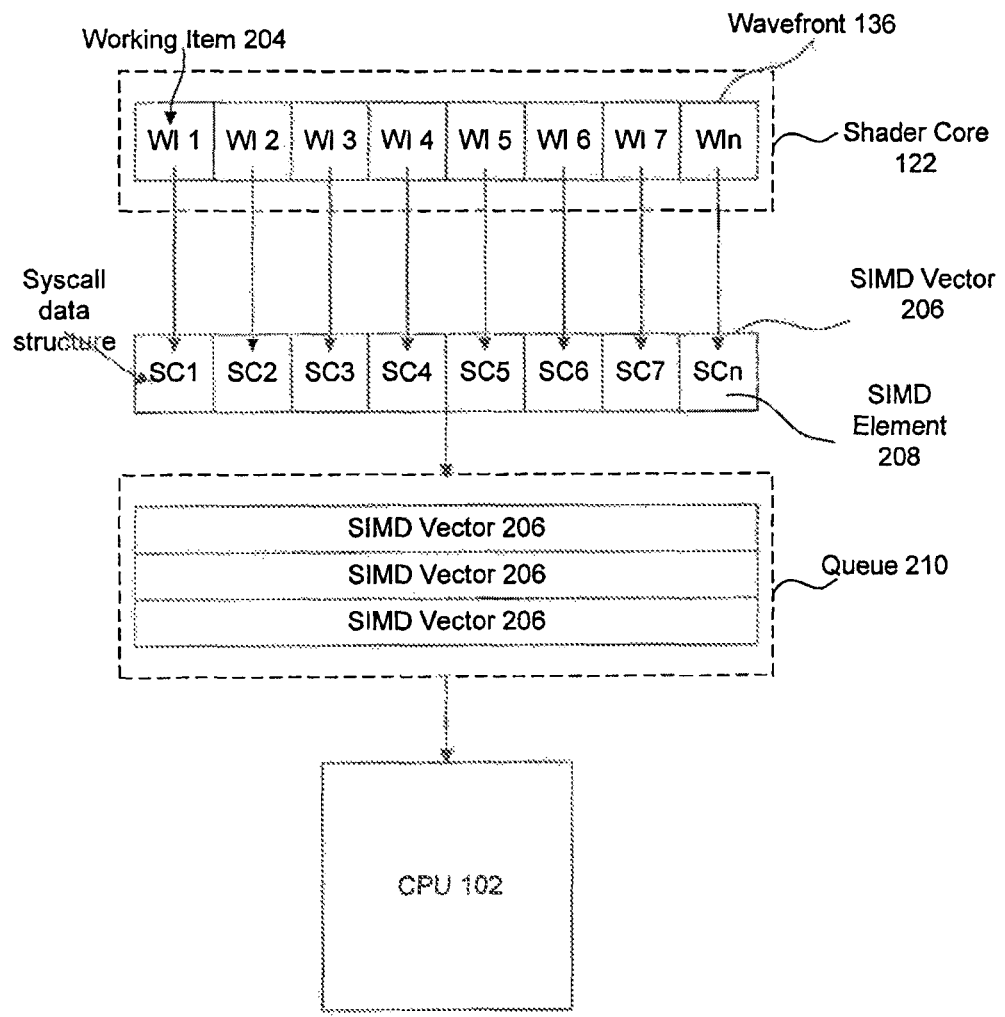
FIG. 2 is an illustrative block diagram illustration 200 of the optimized communication processing between a CPU and an APD.

FIG. 2 is an illustrative block diagram 200 of an optimized communication process between an APD and a CPU for syscall requests. Block diagram 200 includes a wavefront 136, a SIMD vector 208, and a queue 210.

Wavefronts 136 are processed sequentially by shader cores 122. Each wavefront includes multiple work items 204. Each work item 204 is assigned a task or a portion of a task to process. Shader core 122 processes work items 204 in wavefront 136 in parallel and with the same set of instructions. As a result, each work item 204 in wavefront 136 may issue a syscall to CPU 102 at the same time.

Unlike conventional systems, where an APD separately sends a syscall request from each work item to a CPU, APD 104 sends a request using a SIMD vector 206 thus grouping the syscall requests into a single data structure. SIMD vector 206 includes SIMD elements 208. Each SIMD elements includes a syscall data structure. The syscall data structure includes a function selector parameter (a particular syscall request), a list of arguments, and a memory space to return a result of the syscall request to APD 104. One embodiment, an exemplary syscall data structure, is described herein.

When work items 204 require a process that involves an OS, APD 104 stores a syscall request from each work item 204 in a corresponding SIMD element 208. For example, in FIG. 1, work item WI1 stores syscall SC1 in SIMD element 208, work item WI1 stores syscall SC2 in another SIMD element 208, and so forth. APD 104 saves the type of the syscall request from each work item 204 into the function selector parameter. APD 104 can also insert a list of arguments in the argument list section, if needed. APD 104 can also store syscalls from work items from multiple wavefronts 136 in one SIMD vector 206.

Queue 210 is a high-priority public memory queue. A queue operates according to the first-in, first-out ("FIFO") principle. A public queue is a queue visible to CPU 102 and APD 104 processors. Namely, the workload that are first enqueued onto a queue, is the workload that are first dequeued from a queue. Additionally, a person skilled in the art will appreciate that example using a queue data structure is given by way of example and not limitation and that other data structures for may be used.

APD 104 enqueues queue 210 with SIMD vector 206. After APD 104 enqueues SIMD vector 206, in one embodiment APD stalls and waits for CPU 102 to process SIMD vector 206 (i.e., receive the SIMD vector 206, process the syscalls stored therein and transmit the results of each syscall to APD 104). In another embodiment, after APD 104 enqueues queue 210, APD 104 saves the state of the wavefront in memory 106 and begins to process another wavefront. When APD 104 receives a signal from CPU 102 that the processing is complete, APD 104 retrieves the original wavefront 136 from memory 106 and reinstates the processing.

CPU 102 processes tasks received form a high-priority queue ahead of its other processes. Thus, when CPU 102 receives a request from a high-priority queue, such as queue 210, it saves its current process and processes the received request. The example using a high-priority public queue described herein is given by way of example, and not limitation, and a person skilled in the art will appreciate that other memory storage structures can be used.

CPU 102 dequeues SIMD vector 206 from queue 210 and begins to processes SIMD elements 208. CPU 102 invokes an OS and begins to processes the syscall requests stored in the function selector parameter in each SIMD element 208. CPU 102 also reads the argument list stored in SIMD element 208, if required. After CPU 102 completes each syscall request, CPU 102 writes the result into a memory address allocated in each SIMD element 208.

After CPU 102 completes processing all SIMD elements 208, in one embodiment, it enqueues SIMD vector 206 onto a queue 210 and returns SIMD vector 206 to APD 104. Typically, CPU 102 enqueues SIMD vector 206 onto a memory queue 210 that is visible to APD 104.

In another embodiment, when CPU 102 completes processing SIMD vector 206, it sends a signal to APD 104 using a semaphore mechanism. A person skilled in the art will appreciate that a semaphore mechanism ensures that APD 104 does not process other wavefronts while it waits for CPU 102 to complete processing requested syscalls.

After APD 104 dequeues SIMD vector 206 or receives a signal from CPU 102 that syscalls were processed, APD 104 begins to process the wavefront 136 using the results of the requested syscall. In an embodiment where APD 104 can process another wavefront while waiting for CPU to process SIMD vector 206, APD 104 retrieves wavefront 136 from APD memory 130, prior to continuing processing.

One example of a syscall can be a request for memory, such as a malloc( ) function. A malloc( ) request allocates memory for a particular process or function in system memory 106. APD 104 cannot process a malloc( ) request because APD 104 does not have access to an OS. APD 104, therefore, sends a syscall for a malloc( ) request to CPU 102.

APD 104 makes a malloc( ) request when work item 204 in wavefront 136 requests memory. Unlike conventional systems, where an APD sends a separate malloc( ) request from each work item to a CPU, APD 104 sends one SIMD vector 206 to CPU 102 that includes a malloc( ) request for each working item 204 in wavefront 136. APD 104 stores information necessary for a malloc( ) request for each work item in a corresponding SIMD element 208. The necessary information includes a function selector, which is a memory address to the malloc( ) function, a list of arguments, which includes a memory size that CPU 102 needs to allocate to each work item 204, and an empty parameter where CPU 102 stores the address of the allocated space.

Once each work item includes malloc( ) parameters necessary to process each syscall, APD 104 enqueues SIMD vector 206 onto queue 210 as described herein. CPU 102 retrieves SIMD vector 206 from queue 210, and begins to process SIMD elements 208. When CPU 102 processes the malloc( ) requests in SIMD vector 206, CPU 102 makes one call to the OS. CPU 102 then proceeds to allocate memory for each work item 204 in the call to OS. Subsequently, CPU 102, stores the address to the memory space allocated for each work item 204 in SIMD element 208. After CPU 102 completes all syscall requests, CPU 102 returns the SIMD vector 206 to APD 104.

SIMD elements 208 include multiple structures for passing syscalls to CPU 102. In one embodiment, each SIMD element 208 can include a data structure for storing the function selector parameter, the argument list, and the result of the syscall. In a non-limiting example, an exemplary data structure is described as:

```
struct MyTask {
  MyPtr _myCodePtr
    myCPUCodePtr : pointer to code (e.g., x86 binary format)
    myAPDCodePtr :
      //GPR usage in kernel
      //LDS required by kernel
      //Pointer to code (e.g., shader binary format)
      //other parameters
  MyPtr _myDataPtr :
    myExecRange:
```

```
        //Global grid dimensions
        //Local grid dimensions
        myArgSize
        myArgs {(variable size)}
    MyNotification
        //Notification mechanism
    }
```

The MyTask structure includes a MyPtr myAPDCodePtr pointer for processing instructions on APD 104, a MyPtr myCPUCodePtr pointer for processing instructions on CPU 102, and a data pointer myPtr_myDataPtr. When work item 204 requests a syscall from CPU 102, the myAPDCodePtr and myCPUCodePtr pointers point to the memory address of a particular syscall function. The mtDataPtr pointer includes parameters for the argument list and a pointer to the memory address in main memory 106 that contains the result of each syscall.

Additionally, the MyTask structure includes an MyNotification mechanism. APD 104 uses the notification mechanism to notify CPU 102 that MyTask exists in queue 110 that requires processing. Similarly, CPU 102, uses the MyNotification to notify APD 104 that CPU 102 completed processing the syscall.

Figure 3:
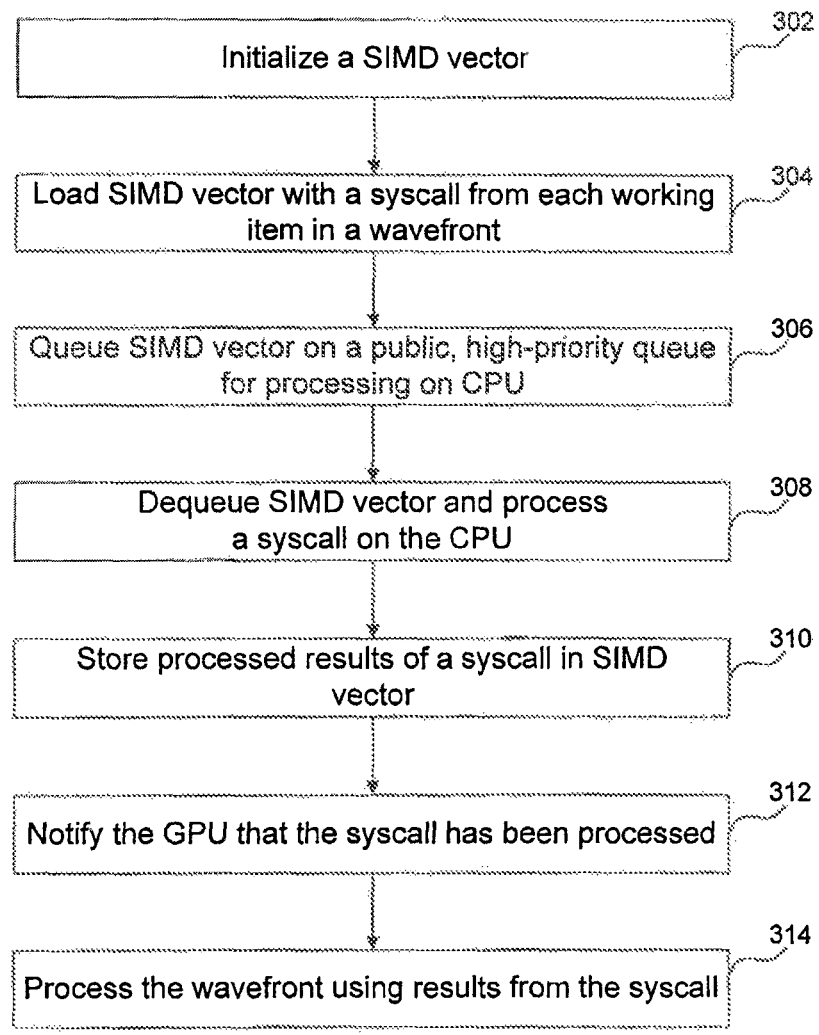
FIG. 3 is an illustrative flowchart 300 of an APD using a single instruction multiple data (SIMD) vector to communicate syscall requests to a CPU.

FIG. 3 is an illustrative flowchart 200 of system 100 processing a syscall request using SIMD vector 206. At step 302, APD 104 initializes SIMD vector 206 when work items 204 in wavefront 136 request a syscall that requires processing using CPU 102. At step 304, each work item 204 stores information necessary for processing a syscall request into a corresponding SIMD element 208 as described herein. At step 306, APD 104 enqueues SIMD vector 206 onto queue 210. At step 308, CPU 102 dequeues SIMD vector 206 from queue 210. After CPU 102 dequeues SIMD vector 206, CPU 102 invokes the OS and begins to process a syscall in each SIMD element 208.

At step 310, CPU 102 writes the result of each syscall into SIMD element 208. A person skilled in the art will appreciate that step 310 may be performed with step 308. At step 312, CPU 102 notifies APD 104 that syscalls have been processed. In one embodiment, CPU 102 sends the SIMD vector 206 back to APD 104, using queue 210 visible to APD 104. In another embodiment, CPU 102 signals APD 104 using a semaphore. At step 314, APD 104 dequeues SIMD vector 206 from queue 210 and continues to process wavefront 136.

Various aspects of the present invention can be implemented by software, firmware, hardware, or a combination thereof. For example, the methods illustrated by flowchart 300 of FIG. 3 can be implemented in unified computing system 100 of FIG. 1. Various embodiments of the invention are described in terms of this example unified computing system 100. It would be apparent to a person skilled in the relevant art how to implement the invention using other computer systems and/or computer architectures.

In this document, the terms "computer program medium" and "computer-usable medium" are used to generally refer to media such as a removable storage unit or a hard disk drive. Computer program medium and computer-usable medium can also refer to memories, such as system memory 106 and graphics memory 130, which can be memory semiconductors (e.g., DRAMs, etc.). These computer program products are means for providing software to unified computing system 100.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is riot limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   storing, in a corresponding single instructor multiple data (SIMD) element, information to process a system call request for each work item in a wavefront;
   grouping the SIMD elements as an SIMD vector to create a system call request data structure;
   transmitting the SIMD vector to a processor for execution; and
   receiving a result to each work item.

2. The method of claim 1, further comprising enqueueing the SIMD vector within a high-priority queue visible to a central processing unit (CPU).

3. The method of claim 1, wherein each SIMD element comprises a function selector, an argument list, and a memory space for the result.

4. The method of claim 1, wherein the SIMD vector includes system call requests from multiple wavefronts.

5. A method, executed in a computer system having at least one processor, comprising:
   receiving a single instructor multiple data CSIMD) vector, wherein the SIMD vector comprises SIMD elements corresponding to a system call request from each work item in a wavefront;
   executing each system call request in each SIMD element; and
   transmitting, via the SIMD vector, the result of each system call to each work item in the wavefront.

6. The method of claim 5, wherein the receiving includes receiving the SIMD vector in a high priority queue visible to a graphics processing device.

7. A system comprising:
   a memory configured to store, in a corresponding single instructor multiple data (SIMD), element, information to process a system call request for each work item in a wavefront, wherein the SIMD elements are grouped as an SIMD vector; and a CPU configured to:
   execute each system call request stored in the SIMD elements, and
   transmit a result of each system call request to each work item in the wavefront.

8. The system of claim 7, wherein the memory is a high-priority queue configured to enqueue the SIMD vector, the high-priority queue being visible to a CPU.

9. The system of claim 7, wherein each SIMD element comprises a function selector, an argument list, and a memory space for the result.

10. The system of claim 8, wherein the SIMD vector includes system call requests from multiple wavefronts.

11. A system, comprising:
a memory; and
a CPU configured to:
   receive a single instruction multiple data (SIMD) vector, wherein the SIMD vector includes SIMD elements containing information to process a corresponding system call request for each work item in a wavefront,
   execute each system call stored in the SIMD vector, and
   transmit the result of each system call to each work item in the wavefront.

12. The system of claim 11, wherein the CPU is further configured to:
receive the SIMD vector from a high priority queue.

13. An article of manufacture including a computer storage device having instructions stored thereon that, when executed by a computing device, cause said computing device to perform operations comprising:
   storing, in a corresponding single instructor multiple data (SIMD) element, information to process a system call request for each work item in a wavefront;
   grouping the SIMD elements as an SIMD vector to create a system call request data structure;
   transmitting the SIMD vector to a processor for execution; and
   receiving a result to each work item in the wavefront.

14. The article of manufacture of claim 13, further comprising enqueueing the SIMD vector within a high-priority queue visible to a CPU.

15. An article of manufacture including a computer storage device having instructions stored thereon that, when executed by a computing device, cause said computing device to perform operations comprising:
   receiving a single instructor multiple data (SIMD) vector, wherein the SIMD vector comprises SIMD elements corresponding to a system call request from each work item in a wavefront;
   executing each system call request from the SIMD vector; and
   transmitting the result of each system call to each work item in the wavefront.

16. The article of manufacture of claim 15, wherein the receiving includes receiving the SIMD vector in a high priority queue visible to a graphics processing device.

17. A computer storage device having instructions recorded thereon that, when executed by a computing device, cause the computing device to perforin operations comprising:
   storing, in a corresponding single instructor multiple data (SIMD) element, information to process a system call request for each work item in a wavefront;
   transmitting said stored system calls, via an SIMD vector, to a processor for execution, wherein the SIMD vector comprises the SIMD elements grouped as a single data structure; and
   responsive to said transmitting, receiving a result to each work item in the wavefront.

18. The computer storage device of claim 17, further comprising enqueueing the SIMD vector within a high-priority queue visible to a central processing unit (CPU).

19. A computer storage device having instructions recorded thereon that, when executed by a computing device, cause the computing device to perform operations comprising:
   receiving a single instructor multiple data (SIMD) vector, wherein the SIMD vector comprises SIMD elements corresponding to a system call request from each work item in a wavefront;
   executing each system call request from the SIMD vector; and
   transmitting the result of each system call to each work item in the wavefront.

20. The computer storpe device of claim 19, wherein the SIMD vector is received from a high priority queue visible to the graphics processing device.

* * * * *

UNITED STATES PATENT AND TRADEMARK OFFICE
CERTIFICATE OF CORRECTION

| | |
|---|---|
| PATENT NO. | : 8,752,064 B2 |
| APPLICATION NO. | : 13/307505 |
| DATED | : June 10, 2014 |
| INVENTOR(S) | : Sander et al. |

Page 1 of 1

It is certified that error appears in the above-identified patent and that said Letters Patent is hereby corrected as shown below:

In the Claims:

Column 14

Line 51 please replace "CSIMD)" with --(SIMD)--.

Column 16

Line 14 please replace "perforin" with --perform--.

Signed and Sealed this
Thirtieth Day of September, 2014

Michelle K. Lee
*Deputy Director of the United States Patent and Trademark Office*